Feb. 17, 1925.

W. S. HARLEY 1,527,133

SHOCK ABSORBER

Filed Dec. 4, 1920

Inventor
William S. Harley.
By Edwin ... Atty.

Feb. 17, 1925.
W. S. HARLEY
SHOCK ABSORBER
Filed Dec. 4, 1920
1,527,133
2 Sheets-Sheet 2
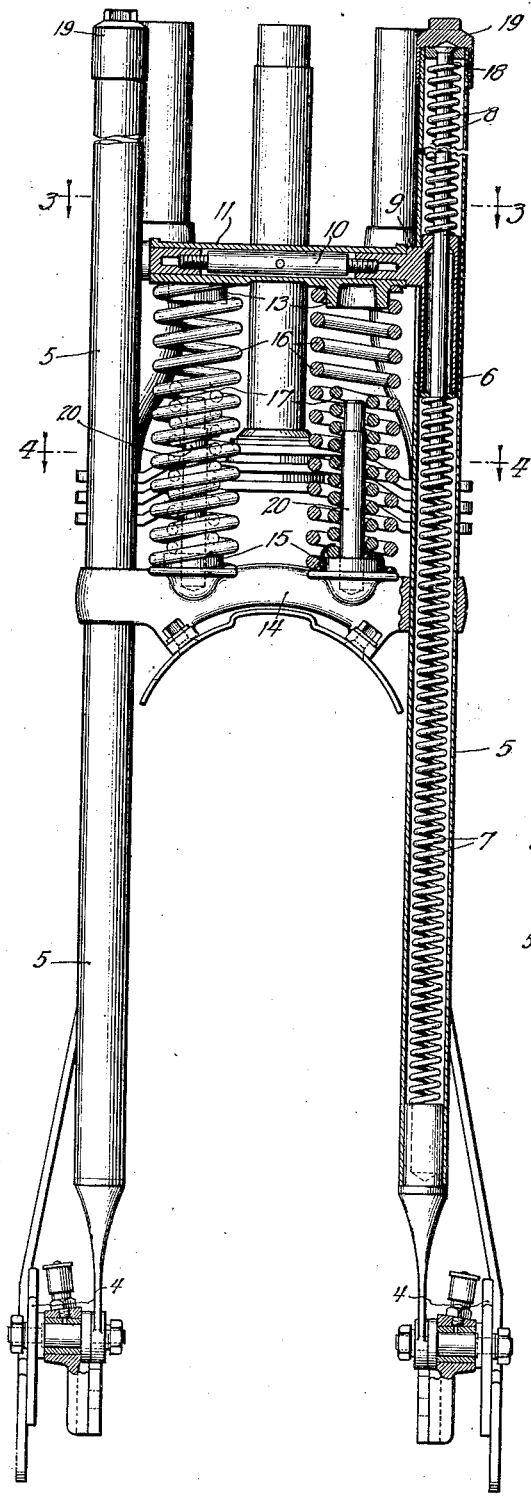
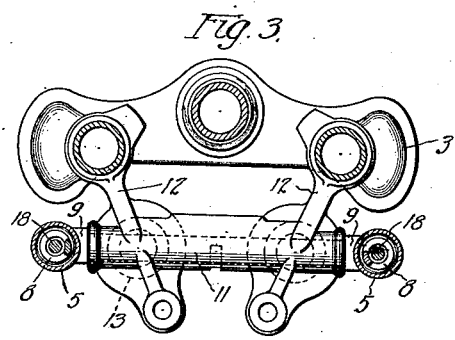
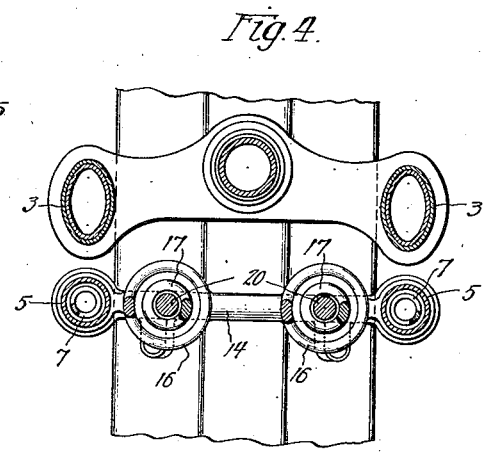
Inventor
William S. Harley.
By Edwin B. H. Tower Jr Atty.

Patented Feb. 17, 1925.

1,527,133

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

SHOCK ABSORBER.

Application filed December 4, 1920. Serial No. 428,382.

*To all whom it may concern:*

Be it known that I, WILLIAM S. HARLEY, a citizen of the United States, residing at Milwaukee, in the county of Milwaukee and State of Wisconsin, have invented new and useful Improvements in Shock Absorbers, of which the following is a specification.

This invention relates to a shock absorber.

More particularly it relates to a shock absorber for use on motorcycles, bicycles and the like.

An object of the invention is to provide an improved shock absorber wherein vibrations or vertical movements of a vehicle will be absorbed without shock or injury to the rider.

Another object is to provide an efficient and reliable shock absorber wherein violent or excessive shocks will be absorbed as readily as minor shocks.

Another object is to provide a shock absorber wherein vibrations or shocks of widely varying intensity are readily absorbed.

Other objects and advantages will hereinafter appear.

According to the invention, the shock absorber comprises a plurality of sets of resilient shock absorbing elements, which cooperate to absorb vibrations or shocks of widely varying intensity and thus protect a rider of the vehicle.

The views of the drawings are:

Figure 2 is an enlarged oblique section through one leg of the front fork on line 2—2 of Figure 1;

Figure 3 is a horizontal transverse section on line 3—3 of Figure 2;

Figure 4 is a horizontal transverse section on line 4—4 of Figure 2.

Figure 1:
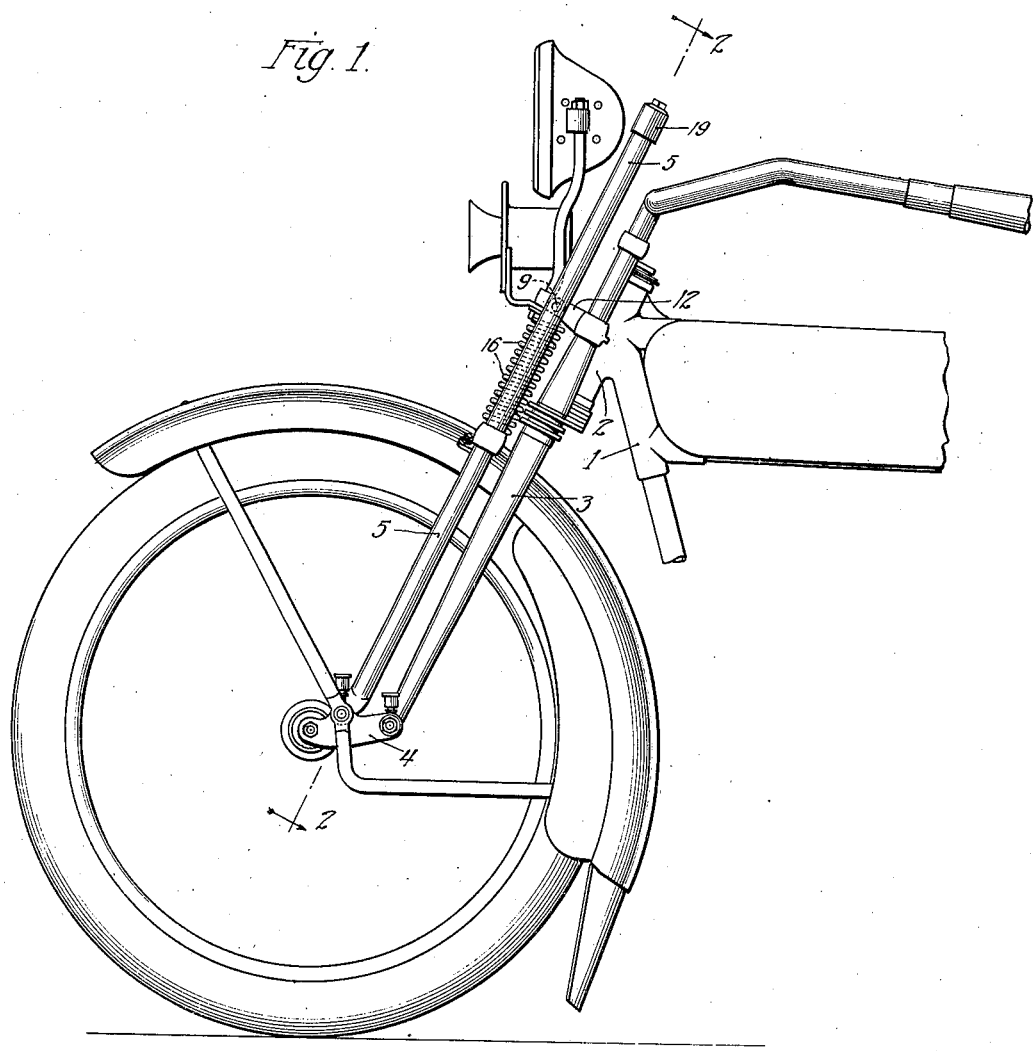
Figure 1 is a side elevation of the front wheel and connected frame of a motorcycle.

Figure 1 shows a motorcycle frame 1 connected to the front wheel by means of a post 2 cooperating with a main front fork 3, the lower ends of which are connected with the wheel axle through links 4, 4.

Adjacent and substantially parallel with the main fork 3 is a floating fork having branches 5 of tubular construction, which are connected at their lower extremities to the links 4, 4 intermediate the ends thereof.

Plungers 6, 6, which reciprocate in the respective tubular branches 5, 5, are joined by a tie rod 10 carried by a yoke 12 through which the plungers are rigidly fastened to the main fork 3 of the motorcycle.

The plungers 6 are resiliently supported in the tubular branches between cushion springs 7 and rebound springs 8.

Thus the occupant of the vehicle and the forward parts of the frame are resiliently supported by the front wheel of the vehicle.

The yoke 12 serves to position the upper ends of the tubular branches, which are independent of each other and of the main fork 3.

Each plunger is provided with an extension 9 projecting at right angles and toward each other through longitudinal slots in the opposing sides of the fork branches into which the tie rod 10 is threaded.

The cushion springs 7, plungers 6 and rebound springs 8 are centered in the tubular branches 5 by means of core rods 18 and held therein by threaded caps 19 by which the springs are maintained under compression.

The cushion springs 7 and rebound springs 8 are highly compressed when inserted in the tubular branches 5. The normal pressure on these springs may be approximately 400 pounds per square inch.

Owing to the pressure to which the springs 7 are subjected when mounted in the tubular branches, these springs readily absorb minor shocks such as encountered in riding over comparatively smooth roads.

To assist the springs 7 in absorbing shocks such as encountered when travelling over comparatively rough roads and prevent injury to the device, there is provided a set of supplemental helical cushion springs 16 seated between a bridge 14 rigidly fastened to the tubular branches 5, 5 and a horizontal head 11 surrounding the tie rod 10.

On the lower side of the horizontal head 11 and on the upper side of the bridge 14 are spring seats or cup-shaped members 13 and 15 to prevent lateral displacement of the springs 16.

The springs 16 are normally compressed only sufficiently to prevent rattling and are much stiffer than the cushion springs 7.

Owing to the slight pressure to which the springs 16 are subjected when mounted on the spring seats, these springs do not become effective to assist the springs 7 in absorbing minor shocks but when rough places in the road bed are encountered the springs 16 are compressed sufficiently to assist the springs 7 in absorbing more severe shocks.

When very severe bumps or depressions in the road bed are encountered the cushion springs 7 and 16 are both compressed until a set of bumper springs 17 are brought into play to assist the other springs and prevent injury to the mechanism.

Thus there are provided three sets of graduated springs to absorb shocks of widely varying intensities.

The springs 17, as clearly shown in Fig. 2, extend upwardly from the spring seats 15 and within the cylindrical paths described by the larger helical springs 16.

Normally the springs 17 do not engage the spring seats 13 and are brought into play or rendered effective only when the springs 7 and 16 are compressed sufficiently to bring the spring seats 13 into engagement therewith.

A rod or pin 20 is provided for centering the springs 17 and causing them to register with the spring seats 13.

The use of the cushion springs 16 and bumper springs 17 makes it possible to make the cushion springs 7 of lighter material and eliminates any likelihood of the springs 7 breaking when rough places in the road-bed are encountered.

Although the shock absorber has been particularly described as applied to motorcycles, it is equally suitable for use on other vehicles.

While but one embodiment has been shown and described, various other embodiments and adaptations may be made of the invention contained herein.

The invention claimed is:

1. A vehicle such as a motorcycle having two forks connected with each other and with the wheel, one fork having tubular branches, a cushioning spring and a plunger in each of said branches, a member extending between said branches and connected to said plungers, another member extending between said branches and fastened thereto, and shock absorbing means between said members.

2. A vehicle such as a motorcycle having two forks connected with each other and with the wheel, one fork having tubular branches, springs and a plunger in each of said branches, a transverse head connecting said plungers, a transverse member extending between said branches and secured rigidly thereto, and a plurality of shock absorbing springs extending between said head and said member.

3. In a vehicle having a frame and a wheel movable up and down with respect thereto, shock absorbing means comprising a floating head connected to the frame, a support connected to the axle of the wheel, a coil spring interposed between and in engagement with the support and the floating head, and a second coil spring concentrically disposed with respect to the first spring and normally engaging the support only, said second spring being adapted to be brought into engagement with the floating head so as to assist the first spring in absorbing excessive shocks.

4. A shock absorber comprising a floating head, a set of springs normally in engagement therewith, a support for said springs, a set of normally inactive springs mounted on said support within said first mentioned springs and adapted to be brought into play to absorb excessive shocks, and two members connected to said head for parallel sliding movement relative to each other.

5. In a vehicle having a frame and a wheel movable up and down with respect thereto, shock absorbing means comprising a floating head connected to one of the vehicle parts, a support connected to another of the vehicle parts, said floating head having sliding engagement with said other of the vehicle parts, a coil spring interposed between and engaging the support and the head, and a second coil spring interposed between the support and the floating head and normally in engagement with one only of these parts, the first spring acting to absorb light shocks and the two springs acting together to absorb greater shocks.

6. A shock absorber comprising a pair of elongated tubular branches, cushioning springs and plungers in said branches, a floating head connecting said plungers, a pair of springs normally in engagement with said head and cooperating with said cushioning springs, and an additional set of springs normally out of engagement with said head and adapted to be engaged thereby under predetermined conditions.

7. Shock absorbing means comprising parallel forks attached to a support providing substantially parallel relative movement between said forks, a bridge rigidly connected to one fork, a compound bridge slidingly connected to one fork and rigidly connected to the other fork, and spring means between said bridges.

8. Shock absorbing means comprising parallel forks attached to a support providing substantially parallel relative movement between said forks, a bridge rigidly connected to one fork, a compound bridge slidingly connected to one fork and rigidly connected to the other fork, and spring means between said bridges, said spring means including a plurality of springs, one of said springs being in contact with both of said bridges only after compression of another of said springs.

9. Shock absorbing means comprising parallel forks attached to a support providing substantially parallel relative movement between said forks, a bridge rigidly connected to one fork, a compound bridge slidingly connected to one fork and rigidly connected to the other fork, and spring means between said bridges, said spring means including co-axial spiral springs, one of said springs being in contact with both of said bridges only after compression of another of said springs.

10. In a vehicle having a wheel and a frame movable vertically with respect thereto, shock absorbing means comprising a floating head connected to the frame, a support connected to the axle of the wheel, a coil spring interposed between and in engagement with the support and the floating head, and a second coil spring normally engaging the support only, said second spring being adapted to be brought into engagement with the floating head to assist the first spring in absorbing excessive shocks.

11. In a vehicle having a wheel and a frame movable vertically with respect thereto, shock absorbing means comprising a floating head connected to the frame, a support connected to the axle of the wheel, a coil spring interposed between and in engagement with the support and the floating head, a second coil spring normally engaging the support only, said second spring being adapted to be brought into engagement with the floating head to assist the first spring in absorbing excessive shocks, and means for centering the second spring.

12. A shock absorber comprising a pair of forks connected to a vehicle for relative movement with respect to each other, and a plurality of parallel springs under different degrees of initial compression successively brought into operation and cooperating to absorb shocks of varying intensities.

13. A shock absorber comprising a pair of forks connected to a wheel for relative movement with respect to each other, and shock absorbing means mounted on said forks and comprising a plurality of springs under different degrees of initial compression acting in parallel to absorb shocks of varying intensities.

14. A shock absorber comprising a pair of forks connecting a wheel and a frame, and absorbing means comprising three springs interposed between the wheel and the frame, two of said springs being under different degrees of initial compression and normally supporting the frame, the third spring being adapted to be brought into cooperative relation with the other two springs to assist in absorbing excessive shocks.

15. A shock absorber comprising a pair of forks adapted to have a wheel connected thereto, and a plurality of springs, one of said springs acting to absorb slight shocks, another of said springs cooperating with the first mentioned spring to absorb medium shocks, and another of said springs cooperating with the first and second mentioned springs to absorb excessive shocks.

16. A shock absorber comprising a pair of forks adapted to have a wheel connected thereto, and a plurality of sets of springs under different degrees of initial compression successively brought into cooperating relation to absorb shocks of varying intensities.

17. A shock absorber comprising a pair of forks connected to a vehicle frame for relative movement with respect to each other, springs under initial compression acting against each other to hold said members in normal position, and another spring under different initial compression to supplement one of said first-mentioned springs when under abnormal compression.

In witness whereof, I have hereunto subscribed my name.

WILLIAM S. HARLEY.